(12) United States Patent
Yanagi (10) Patent No.: US 10,252,232 B2
(45) Date of Patent: Apr. 9, 2019

(54) METHOD FOR PRODUCING PARTICLES

(71) Applicant: Toyota Jidosha Kabushiki Kaisha, Toyota-shi, Aichi-ken (JP)

(72) Inventor: Takuo Yanagi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 364 days.

(21) Appl. No.: 15/205,070

(22) Filed: Jul. 8, 2016

(65) Prior Publication Data

US 2017/0008808 A1   Jan. 12, 2017

(30) Foreign Application Priority Data

Jul. 8, 2015 (JP) ................... 2015-137278

(51) Int. Cl.
| | | |
|---|---|---|
| *B01J 2/06* | (2006.01) | |
| *C01D 15/00* | (2006.01) | |
| *C01B 17/22* | (2006.01) | |
| *H01M 10/0562* | (2010.01) | |

(52) U.S. Cl.
CPC ............... *B01J 2/06* (2013.01); *C01B 17/22* (2013.01); *C01D 15/00* (2013.01); *H01M 10/0562* (2013.01); *H01M 2300/0068* (2013.01)

(58) Field of Classification Search
CPC ............ B01J 2/06; C01B 17/22; C01D 15/00; H01M 10/0562; H01M 2300/0068
USPC .......................................................... 428/402
See application file for complete search history.

(56) References Cited

U.S. PATENT DOCUMENTS

2014/0272554 A1* 9/2014 Yanagi .............. H01M 10/0562
429/189

FOREIGN PATENT DOCUMENTS

| JP | 07316087 | A | 12/1995 |
|---|---|---|---|
| JP | 07316087 | * | 12/2005 |
| JP | 3796763 | * | 7/2006 |
| JP | 3796763 | B2 | 7/2006 |
| JP | 5692266 | * | 4/2015 |
| JP | 5692266 | B2 | 4/2015 |

* cited by examiner

*Primary Examiner* — Leszek B Kiliman
(74) *Attorney, Agent, or Firm* — Dinsmore & Shohl LLP (57) ABSTRACT

A method for efficiently producing fine particles in a complex state from a plurality of raw material components is provided. The method includes spraying a good solvent solution made from a good solvent and the plurality of raw material components dissolved in the good solvent into a poor solvent having a temperature of at least 165° C. higher than the boiling point of the good solvent and evaporating off the good solvent and precipitating a plurality of fine particles.

5 Claims, 6 Drawing Sheets

METHOD FOR PRODUCING PARTICLES

TECHNICAL FIELD

The present disclosure relates to a method for producing particles.

BACKGROUND ART

Conventional techniques for precipitating particles from solution include methods in which a solution is heated in a container to evaporate off and remove the solvent and obtain particles (hereunder referred to as "dry evaporation methods"), methods in which a solution is sprayed into hot air to evaporate the solvent in a gas phase, and precipitate particles as a dry powder (hereunder referred to as "spray dry methods"), and methods in which a solution of a solute dissolved in a good solvent is added dropwise to a heated poor solvent and the good solvent is evaporated off, to obtain a slurry of the particles and the poor solvent (hereunder referred to as "common methods using a good solvent and poor solvent").

Specific examples of common methods using a good solvent and poor solvent are described in PTL 1 (Japanese Unexamined Patent Publication HEI No. 7-316087). PTL 1 discloses a method for producing 2,2-bis[3,5-dibromo-4-(2, 3-dibromopropoxy)phenyl]propane (hereunder abbreviated as TBA-BP), in the form of needle crystals that have excellent thermal stability and storage stability, as well as an improved powder flow property.

Dry evaporation methods, spray dry methods and common methods using a good solvent and poor solvent are all employed as methods for precipitating particles. In such methods, the rate of solvent evaporation is relatively slow. Therefore, the particles precipitate slowly by crystal growth, and it is difficult to obtain particles with low crystal growth. In addition, when particles are precipitated from a solution in which a plurality of raw material components have been dissolved, the raw material components precipitate as separate crystals with low solubility, and it is therefore difficult to obtain fine particles with the different raw material components in a complexed state.

The aforementioned methods are therefore poorly efficient when the goal is to produce fine particles comprising different raw material components in a complexed state.

SUMMARY

It is thus an object of the present disclosure to provide a method for efficiently producing fine particles with a plurality of raw material components in a complexed state, and having low crystal growth.

In embodiments, a method for producing fine particles wherein a good solvent solution comprising a good solvent and a plurality of raw material components dissolved in the good solvent is provided. The good solvent solution is sprayed into a poor solvent having a temperature of at least 165° C. higher than the boiling point of the good solvent in order to evaporate off the good solvent and precipitate the plurality of particles. The good solvent solution may be in the state of a slurry with at least one type of raw material component in powdered form dispersed in the good solvent and the total concentration of the plurality of raw material components dissolved in the good solvent may be 10 g/l or greater. The plurality of raw material components may include lithium sulfide, lithium iodide and lithium bromide, and the particles are raw material particles of a solid electrolyte material. Solid solution particles are provided with sulfur, lithium, iodine and bromine as solid solution components. The solid solution particles have an x-ray diffraction peak, using CuKα rays, attributable to the (111) face of lithium sulfide, lithium iodide and lithium bromide in the diffraction angle 2θ range of 25.9° or greater and less than 28.0° The mean primary particle size is no greater than 5 μm.

Accordingly, the instant disclosure provides a method for efficiently producing fine particles with a plurality of raw material components in a complexed state and low crystal growth.

DETAILED DESCRIPTION

Embodiments of the disclosure will now be explained in detail. The present disclosure is not limited to the embodiments described below, and various modifications may be implemented within the scope of the gist thereof.

I. Method of Precipitating Particles

The present disclosure includes embodiments for producing particles wherein a good solvent solution comprising a good solvent and a plurality of raw material components dissolved in the good solvent is sprayed into a poor solvent having a temperature of at least 165° C. higher than the boiling point of the good solvent in order to evaporate off the good solvent and precipitate the plurality of particles.

Figure 1:
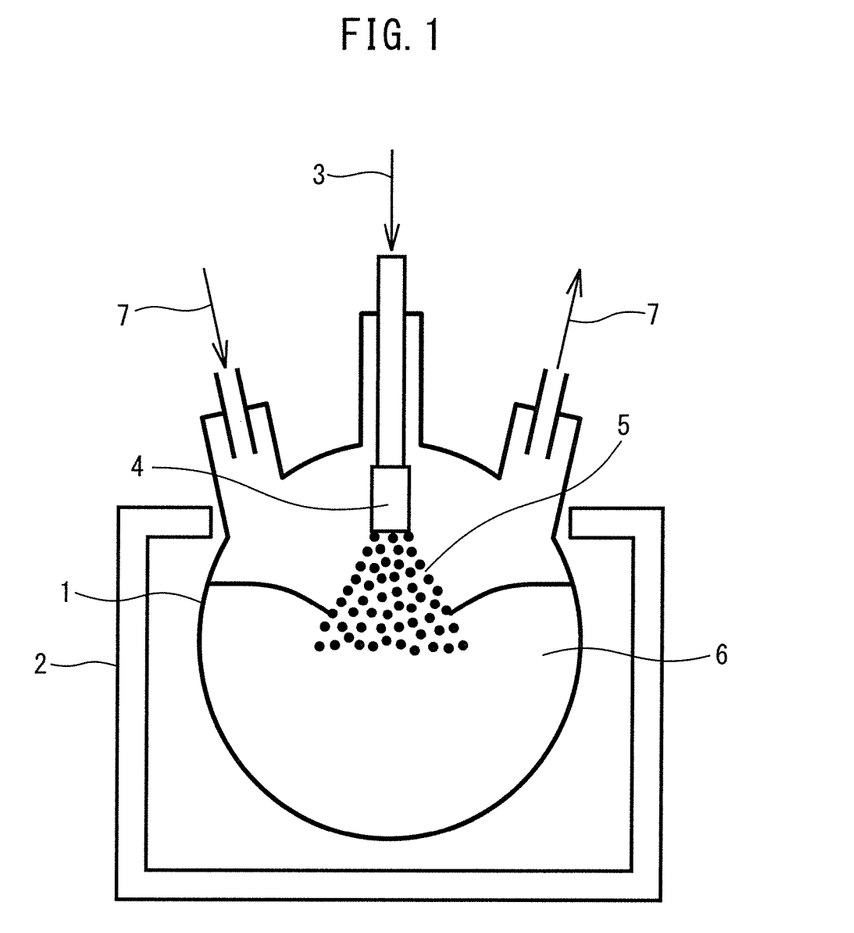
FIG. 1 shows an example of an embodiment of the method of the disclosure.

Referring to FIG. 1, a poor solvent is placed in a container (1) and heated to a high temperature of at least 165° C. higher than the boiling point of the good solvent using a heating apparatus (2). Next, a good solvent solution (3) is sprayed into or on the heated poor solvent (6) through a spray nozzle (4) as an atomized good solvent solution (5). When the sprayed atomized good solvent solution (5) contacts the liquid surface of the poor solvent, the good solvent in the good solvent solution evaporates and fine particles comprising the raw material components in a complexed state precipitate in the poor solvent. The evaporated good solvent is ejected out of the container together with a circulating gas (7) previously circulating through the container. Incidentally, FIG. 1 does not restrict the embodiment of the disclosure to this mode.

While it is not the intention to be restricted to any particular principle, it is believed that the principle of action according to the disclosure is as follows.

In a method of precipitating a plurality of raw material components as particles in a solution by evaporation of the solvent in the solution, a slow evaporation rate of the solvent causes the raw material components to grow and precipitate as separate particles according to their solubilities as large particles with few defects. In such a method, however, if the evaporation rate of the solvent is sufficiently rapid, the raw material components precipitate as complexed particles without being separated according to solubility and without crystal growth.

According to the disclosure, the good solvent solution dissolving the plurality of raw material components is sprayed into or on the poor solvent heated to high temperature and the good solvent solution contacts the poor solvent heated to high temperature as minute droplets. The good solvent evaporates instantaneously on the liquid surface of the poor solvent. Therefore, since the evaporation rate of the good solvent in the good solvent solution is rapid, the raw material components precipitate as fine particles in a complexed state without being separated according to solubility and without crystal growth. Also, even when the good solvent solution is in the form of a slurry further containing at least one type of raw material powder dispersed in the good solvent, it is possible to obtain complexed fine particles containing the raw material component powder. In such cases, when the good solvent has evaporated, the raw material powder is preferably disaggregated and forms fine particles together with the raw material components precipitating from the good solvent solution.

A higher concentration of raw material components dissolved in the good solvent solution will allow the raw material components to be recovered in a more complexed state. This is because a higher concentration of dissolved raw material components further increases the viscosity of the solution, resulting in inhibition of movement of the ions in the solution, and when the good solvent has been evaporated, the raw material components tend to precipitate by crystallization without changing their arrangement in the solution.

In contrast, in a dry evaporation method, a spray dry method or a common method using a good solvent and poor solvent, it is not possible to efficiently recover complexed fine particles, for the following reason.

With a dry evaporation method, the evaporation rate of the solvent is slow and therefore large particles precipitate, having undergone slow crystal growth. Consequently, in a dry evaporation method it is difficult to recover fine particles with a plurality of raw material components in a complexed state.

In the case of a spray dry method, the solvent can be evaporated more rapidly than by a dry evaporation method, but since the rate at which the solvent evaporates is not sufficient, the particles in the gas space collide with other particles and aggregate while drying, with the precipitated particles aggregating on the container bottom. Consequently, it is difficult to recover fine particles with a plurality of raw material components in a complexed state.

In the case of a common method using a good solvent and a poor solvent, when the good solvent solution is dropped to the poor solvent, the good solvent solution at first mixes with the poor solvent, forming a mixed solution. The good solvent then evaporates gradually upon heating of the poor solvent, and escapes from the mixed solution. In this case, since the rate at which the good solvent escapes is slow, the raw material component precipitates as large particles with crystal growth. Also, since the raw material components slowly precipitate in order of lowest solubility, they precipitate as mutually separate particles, and are difficult to precipitate in a complexed state. Consequently, it is difficult to recover fine particles with a plurality of raw material components in a complexed state.

<Raw Material Components>

According to the disclosure, a raw material component is a component serving as raw material for particles to be produced by a method for producing particles according to the disclosure. According to the disclosure, a plurality of raw material components are used that dissolve in the good solvent, and any desired powdered raw material components that disperse in the good solvent may be used. There are no particular restrictions on the raw material components, and the plurality of raw material components may be used as suits the purpose. For example, when the object is to recover solid solution particles including sulfur, lithium, iodine and bromine as components in solid solution, lithium sulfide, lithium iodide and lithium bromide may be used as raw material components.

<Good Solvent>

A "good solvent" according to the disclosure is a solvent that can dissolve all or some of the raw material components of the disclosure and that has higher solubility for the raw material components than the poor solvent according to the disclosure. The good solvent for the disclosure is not particularly restricted, and methanol, water, toluene and the like may be used.

<Good Solvent Solution>

The good solvent solution for the disclosure is a solution having the raw material components dissolved in the good solvent. There is no particular restriction on the concentration of the plurality of raw material components in the good solvent solution, but it is preferably a total concentration of 5 g/l or greater, 10 g/l or greater, 20 g/l or greater or 50 g/l or greater. This is because a higher concentration of raw material components in the good solvent solution will allow more complexed particles to be obtained. According to the disclosure, the good solvent solution may also be in the form of a slurry further containing at least one type of raw material component powder dispersed in the good solvent.

<Poor Solvent>

The poor solvent of the disclosure is a solvent having lower solubility for the raw material components than the good solvent. The poor solvent is heated to a temperature of at least 165° C. higher than the boiling point of the good solvent. The difference between the boiling point of the good solvent and the temperature to which the poor solvent is heated may be 170° C. or higher, 175° C. or higher, 180° C. or higher or 190° C. or higher. There are no particular restrictions on the heating method, and any method may be used so long as it is a method that can heat the poor solvent to the target temperature. Since a higher poor solvent temperature above the boiling point of the good solvent will result in a more rapid evaporation rate of the good solvent, the heating temperature has no particular upper limit, but it is preferably no higher than the boiling point of the poor solvent.

The poor solvent for the disclosure is not particularly restricted, but since the poor solvent is heated to a temperature of at least 165° C. higher than the boiling point of the good solvent, a solvent having a high enough boiling point to allow heating to that temperature is used. The solvent with a relatively high boiling point used as the poor solvent may be, for example, dodecane (boiling point: approximately 216° C.) or tridecane (boiling point: approximately 235° C.), but the poor solvent is preferably selected in consideration of the relationship with the boiling point of the good solvent that is used for the disclosure. Specifically, it is preferred to select a poor solvent having a boiling point of at least 165° C. higher than the boiling point of the good solvent. For example, when the good solvent used is methanol (boiling point: approximately 65° C.), the poor solvent that is selected may be tridecane (boiling point: approximately 235° C.)

<Spraying>

According to the disclosure, the good solvent solution is sprayed into the poor solvent that is heated to a temperature of at least 165° C. higher than the boiling point of the good solvent. The method of spraying is not particularly restricted so long as it is a method that allows spraying of the good solvent solution in atomized form and allows it to contact with the poor solvent. The method of spraying may be, for example, spraying from above the poor solvent liquid surface, or spraying with the nozzle tip immersed in the poor solvent. The spraying apparatus may be a spray nozzle, for example, and more specifically a pressure nozzle, injector, two-fluid nozzle or the like.

According to the disclosure, the poor solvent is heated to a significantly higher temperature than the good solvent solution, and therefore at the instant when the good solvent solution has contacted with the poor solvent, the good solvent in the good solvent evaporates, and particles in a complexed state of the raw material components precipitate near the liquid surface of the poor solvent.

II. Solid Solution Particles

Solid solution particles of the disclosure include sulfur, lithium, iodine and bromine as solid solution components, wherein the position of the peak attributable to the (111) face of lithium sulfide, lithium iodide and lithium bromide is in the range of diffraction angle $2\theta=25.9°$ or greater and less than 28.0°, in measurement by X-ray diffraction using CuK$\alpha$ rays, and the mean primary particle size is no greater than 5 µm.

The use of the solid solution particles of the disclosure is not particularly restricted, and for example, they may be used as raw material for a sulfide solid electrolyte material to be used in an all-solid secondary battery.

In the production process for a sulfide solid electrolyte in an all-solid secondary battery, the sulfide solid electrolyte material can be fabricated using raw materials such as lithium sulfide, lithium iodide, lithium bromide and phosphorus pentasulfide, as examples. The sulfide solid electrolyte material can be fabricated, for example, through a process of mixing with the raw materials using mechanical milling or the like. In the process, the raw materials can be mixed more easily, and productivity of the sulfide solid electrolyte material can be improved, if the solid solution particles of lithium sulfide and lithium iodide and lithium bromide in a complexed state are mixed with phosphorus pentasulfide, than if the raw materials such as lithium sulfide, lithium iodide, lithium bromide and phosphorus pentasulfide are directly mixed by mechanical milling. The solid solution particles used for production of such a sulfide solid electrolyte material preferably have the raw material components in a highly complexed state, with low crystal growth and small particle diameters. Therefore, the solid solution particles of the disclosure are preferably used for production of a sulfide solid electrolyte.

<Solid Solution Components>

The solid solution particles of the instant disclosure include sulfur, lithium, iodine and bromine as solid solution components. The component ratio of the sulfur, lithium, iodine and bromine is not particularly restricted, and it may be varied to match the purpose of use of the solid solution particles.

<X-ray Diffraction Measurement>

The position of the peak attributable to the (111) face of lithium sulfide, lithium iodide and lithium bromide of the solid solution particles of the instant disclosure may be a diffraction angle $2\theta=25.9°$ or greater and less than 28.0°, and since most of either the lithium iodide or lithium bromide is taken up into the lithium sulfide crystals to form a complex, depending on the compositional ratio of the raw materials, the peak of either lithium iodide or lithium bromide may be low and unmeasurable depending on the case.

<Particle Diameter>

The mean primary particle size of the solid solution particles of the disclosure is no greater than 5 µm. The mean primary particle size of the solid solution particles of the disclosure can be measured using a LA-920 laser diffraction scattering particle size distribution meter (product of Horiba, Ltd.).

EXAMPLES

Example 1

Lithium sulfide, lithium iodide and lithium bromide (molar ratio=6:1:1), as raw material components, were dissolved in methanol (boiling point: approximately 65° C.) as the good solvent, to a total raw material component concentration of 5 g/l in the good solvent solution, to prepare a good solvent solution dissolving the raw material components. After placing 350 ml of tridecane (boiling point: approximately 235° C.) as the poor solvent in a 500 ml round bottom flask, it was placed in an oil bath heated to 230° C. After stabilization of the temperature of the poor solvent, the good solvent solution was sprayed to the poor solvent through a pressure nozzle at about 50 ml/min over a period of 5 minutes. Next, spraying was terminated and the precipitate that precipitated in the poor solvent was filtered in a glove box and recovered to obtain Example 1 particles. The difference between the boiling point of the good solvent and the heating temperature of the poor solvent in Example 1 was approximately 165° C.

Examples 2, 3 and 4

Particles were obtained for Example 2, Example 3 and Example 4 in the same manner as Example 1, except that the total concentrations of lithium sulfide, lithium iodide and lithium bromide as the raw material components in the good solvent solution were 10 g/l, 20 g/l and 50 g/l, respectively.

Comparative Example 1

Particles for Comparative Example 1 were obtained in the same manner as Example 1, except that the total concentration of lithium sulfide, lithium iodide and lithium bromide as the raw material components in the good solvent solution was 50 g/l, the heating temperature of tridecane as the poor solvent was 80° C., the good solvent solution was dropped into the poor solvent for 10 minutes under stirring at ordinary pressure, with a droplet diameter of about 2 mm and a rate of 5 ml/min, while continuously distilling off the good solvent, and after completion of dropping of the good solvent solution, evaporative distillation was continued for about 30 minutes while heating the temperature of the round bottom flask to 80° C. The difference between the boiling point of the good solvent and the heating temperature of the poor solvent in Comparative Example 1 was approximately 15° C.

Comparative Example 2

Particles for Comparative Example 2 were obtained in the same manner as Comparative Example 1, except that the temperature of the tridecane as the poor solvent was heated to 230° C. The difference between the boiling point of the good solvent and the heating temperature of the poor solvent in Comparative Example 2 was approximately 165° C.

Reference Example

1-Pentanol (boiling point: approximately 138° C.) was loaded as the good solvent so that the total concentration of the lithium sulfide, lithium iodide and lithium bromide as raw material components in the good solvent solution was 20 g/l, hydrogen sulfide was circulated through while stirring, and lithium sulfide was converted to lithium hydrogen sulfide to dissolve all of the raw material components, to prepare a good solvent solution. After placing 400 ml of tridecane as the poor solvent in a 1000 ml round bottom flask, it was placed in an oil bath that had been heated to 230° C. After stabilization of the temperature of the poor solvent, the good solvent solution was sprayed onto the poor solvent through a pressure nozzle at about 50 ml/min for 11 minutes. The evaporating vapor was cooled with a condenser tube (tap water temperature) and liquefied and recovered. The difference between the boiling point of the good solvent and the heating temperature of the poor solvent in the reference example was approximately 92° C.

Since vapor continued to be generated after completion of the spraying, the temperature of the round bottom flask was maintained. After approximately 30 minutes had passed, almost no more liquid was found to be recovered by the condenser tube, but the temperature of the round bottom flask was held for 30 minutes thereafter. Next, heating was suspended and the round bottom flask was placed in a glove box and filtration was performed under an argon atmosphere for separation into a solid portion and a filtrate. The filtrate was discharged out of the glove box, and upon sensing the smell, the smell of 1-pentanol as the good solvent was confirmed.

Since vapor continued to be generated even after termination of the spraying, and the odor of 1-pentanol as the good solvent was confirmed from the filtrate, this suggested that the good solvent in the good solvent solution that had been sprayed into the poor solvent had mixed with the poor solvent without immediately evaporating at the liquid surface of the poor solvent, and had formed a mixed solution.

This further suggested that with heating of the poor solvent to approximately 92° C. (approximately 230° C. to 138° C.) higher than the boiling point of the good solvent, even if the good solvent solution is sprayed onto the poor solvent, the good solvent cannot be instantaneously evaporated at the liquid surface of the poor solvent.

<Evaluation 1>

Figure 2:
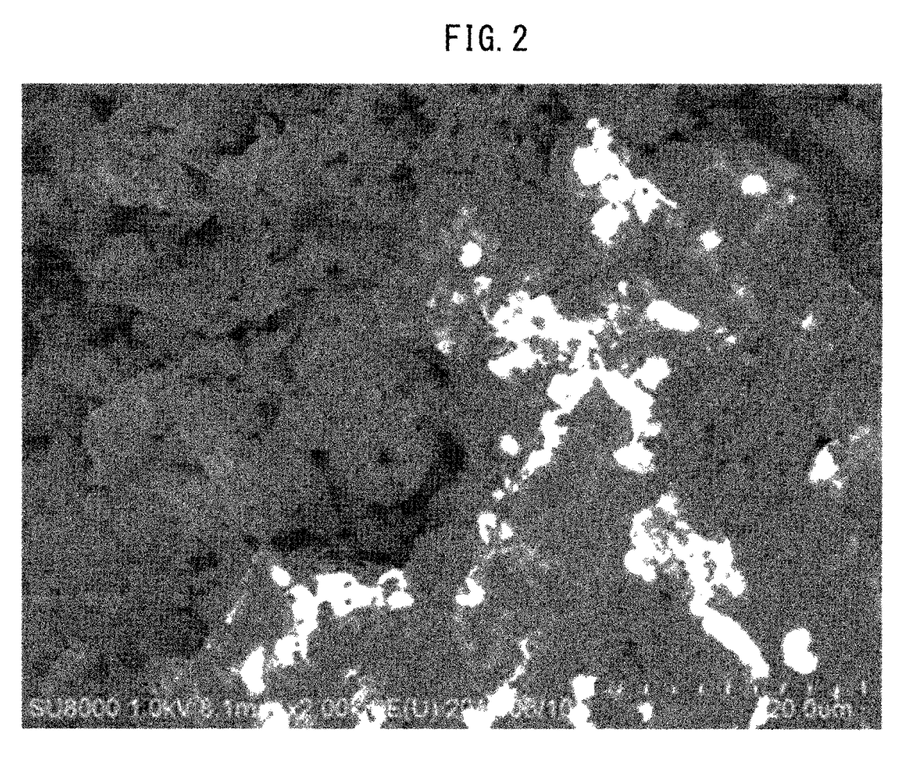
FIG. 2 is a scanning electron micrograph of particles obtained by the method of Comparative Example 1.
Figure 3:
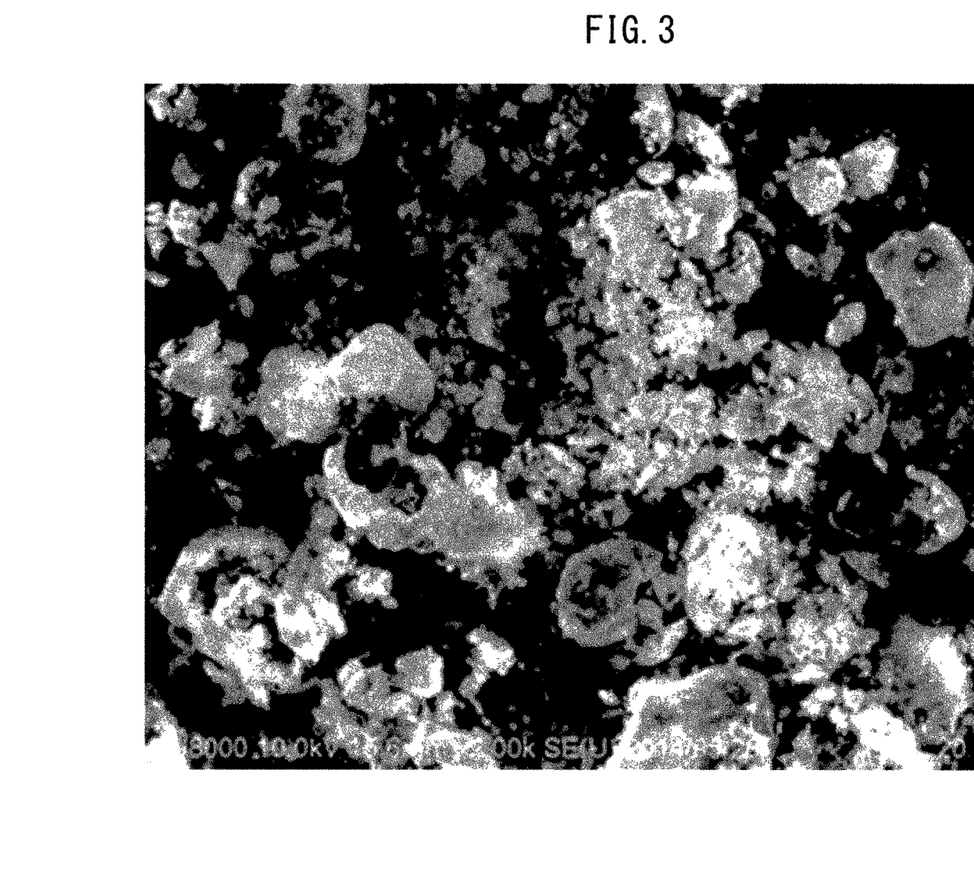
FIG. 3 is a scanning electron micrograph of particles obtained by the method of Comparative Example 2.
Figure 4:
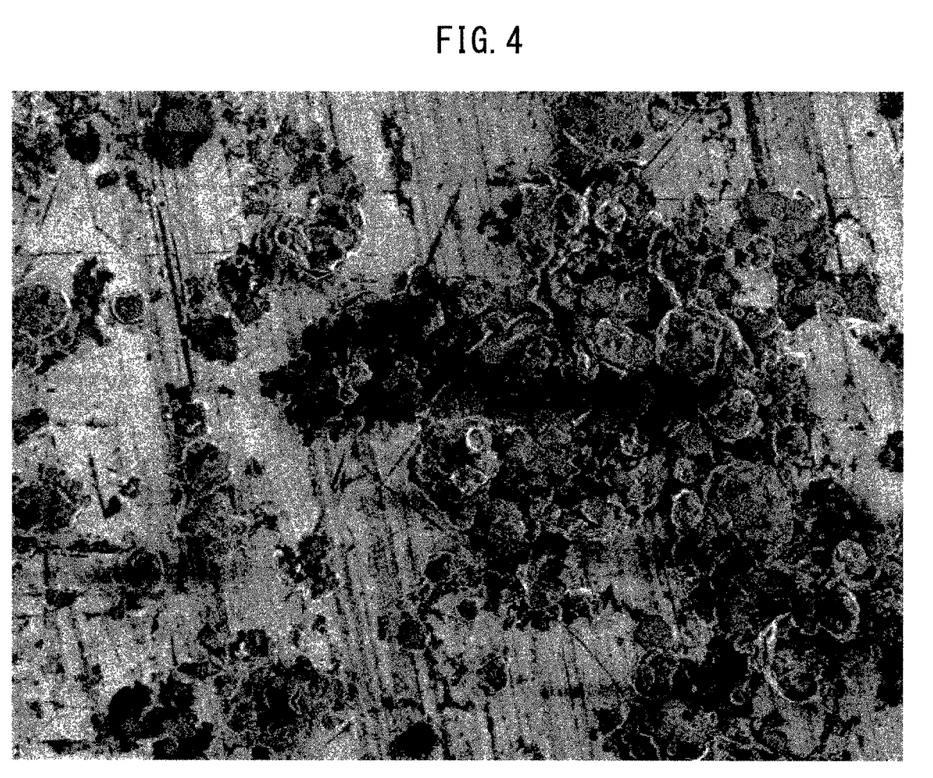
FIG. 4 is a scanning electron micrograph of particles obtained by the method of Example 4.

The observation results of the precipitates obtained by precipitation, obtained using a scanning electron microscope, are shown in FIG. 2 for Comparative Example 1, in FIG. 3 for Comparative Example 2 and in FIG. 4 for Example 4.

In FIG. 2 which is the scanning electron micrograph for Comparative Example 1, large particles with particle diameters of 50 μm or greater were observed. The sections of higher brightness are the sections where iodine and/or bromine are localized.

As seen in FIG. 2, particles with large particle diameters precipitated in Comparative Example 1, making it impossible to obtain fine particles. Moreover, sections where iodine and/or bromine were localized were observed, and therefore the precipitated particles were not in a complexed state. This suggests that, since the good solvent evaporated slowly, the concentration of the good solvent slowly decreased in the mixed solvent comprising the poor solvent and the good solvent, whereby crystal growth took place slowly and the difference in solubilities resulted in precipitation of the raw material components as different crystals.

In FIG. 3 which is the scanning electron micrograph for Comparative Example 2, hollow particles of 10 to 15 μm were observed. The peripheries of the hollow particles had finely dispersed fragments of the broken hollow particles.

From FIG. 3 it is seen that when precipitation of the raw material components was conducted by a known method under high-temperature conditions, hollow particles of 10 to 15 μm were obtained. This is thought to be because the good solvent in the good solvent solution, dropped into the poor solvent that had been heated to high temperature, could not thoroughly evaporate on the liquid surface of the poor solvent. In other words, it is thought that since the good solvent solution was dropped into the poor solvent and the good solvent evaporated from the sections where the surfaces of the droplets of the good solvent solution in the poor solvent contacted with the poor solvent, hollow particles were thus obtained.

In FIG. 4, which is the scanning electron micrograph for Example 4, particles of 1 to 5 μm were confirmed.

From FIG. 4, it is seen that when precipitation was by the method of the disclosure, a precipitate was recovered as fine particles of 5 μm or smaller. This suggests that the good solvent in the good solvent solution evaporated instantaneously at the liquid surface of the poor solvent by spraying, and the raw material components dissolved in the good solvent solution instantaneously precipitated.

<Evaluation 2>

Figure 5:
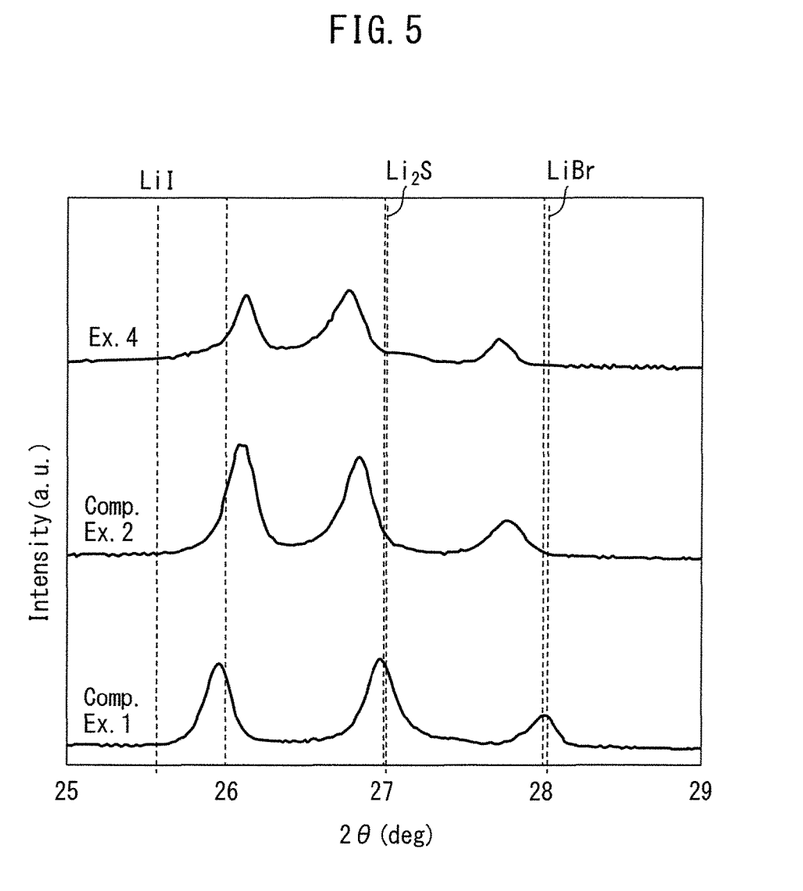
FIG. 5 is a diagram showing the measurement results for X-ray diffraction of particles obtained by the methods of Example 4 and Comparative Examples 1 and 2.

FIG. 5 shows a comparison of the results of X-ray diffraction for crystals obtained by the methods of Example 4, Comparative Example 1 and Comparative Example 2.

As shown in FIG. 5, in Comparative Example 1, a first peak was present at $2\theta=25.94$, a second peak was present at $2\theta=26.96$, and a third peak was present at $2\theta=28.00$. In Comparative Example 2, a first peak was present at $2\theta=26.06$, a second peak was present at $2\theta=26.84$, and a third peak was present at $2\theta=27.78$. In Example 4, a first peak was present at $2\theta=26.12$, a second peak was present at $2\theta=26.76$, and a third peak was present at $2\theta=27.70$.

In Comparative Example 2 and Example 4, the first peak was shifted toward the right and the second and third peaks were shifted to the left, compared to Comparative Example 1. Also, the degree of the shift was greater in Example 4 than in Comparative Example 2. Moreover, it can be said that the intensity of each peak was lower overall in Example 4 compared to Comparative Examples 1 and 2.

Based on these results, it is thought that in the precipitate of Example 4, more complexed crystals were obtained than in the precipitates of Comparative Examples 1 and 2.

The peak near $2\theta=26$ represents the peak for lithium iodide ((111) face), the peak near $2\theta=27$ represents the peak for lithium sulfide ((111) face), and the peak near $2\theta=28$ represents the peak for lithium bromide ((111) face).

Also, more shifting of these peaks may be considered to be more solid solution of other salt anions in the crystals represented by the peaks. For example, shifting of the peak for lithium iodide toward the high-angle end indicates contraction of the lithium iodide crystal lattice, the contraction of the crystal lattice resulting due to replacement by bromide ions or sulfide ions, which have smaller forms than iodide ions.

<Evaluation 3>

Figure 6:
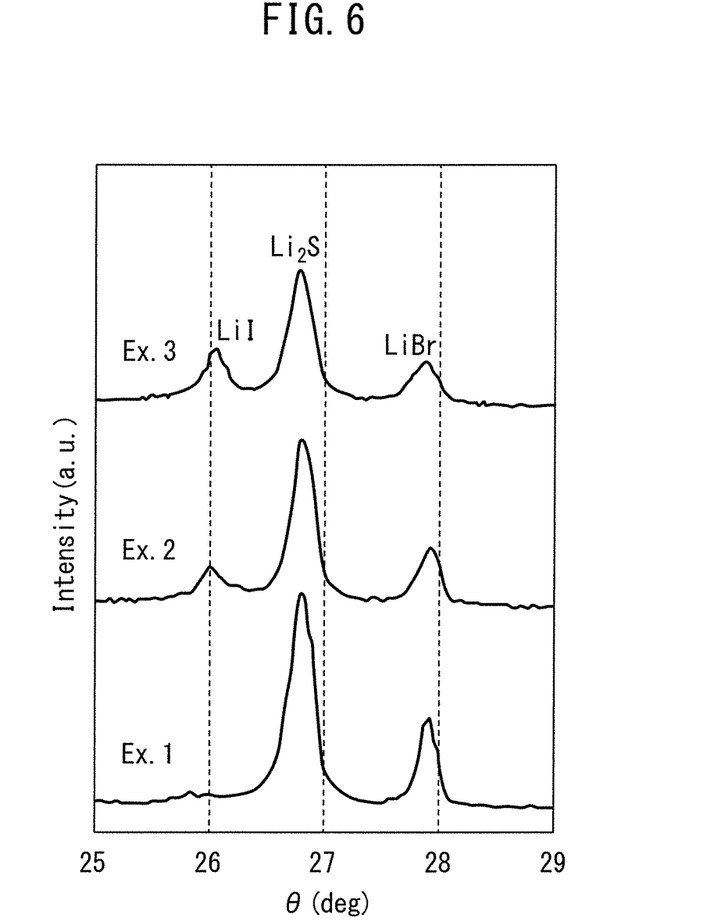
FIG. 6 is a diagram showing the measurement results for X-ray diffraction of particles obtained by the methods of Examples 1 to 3.

FIG. 6 is a diagram showing a comparison of the measurement results for X-ray diffraction of precipitates obtained by the methods of Examples 1 to 3.

Based on FIG. 6, when the concentration of raw material components was 5 g/l, the first peak was present at $2\theta=25.90$, the second peak was present at $2\theta=26.84$ and the third peak was present at $2\theta=27.94$. When the concentration of raw material components was 10 g/l, the first peak was present at $2\theta=26.08$, the second peak was present at $2\theta=26.84$ and the third peak was present at $2\theta=27.88$. When the concentration of raw material components was 20 g/l, the first peak was present at $2\theta=26.10$, the second peak was present at $2\theta=26.82$ and the third peak was present at $2\theta=27.84$.

This suggests the following. As the concentration of raw material components in the solution increases, a peak appears near $2\theta=26$, and the peak intensities near $2\theta=26.7$ and 28 are reduced. Also, the peak near $2\theta=26$ shifts toward the right as the concentration of raw material components in the solution increases, and the peaks near $2\theta=26.7$ and 28 move toward the left as the concentration of raw material components in the solution increases.

This demonstrates that a higher concentration of raw material components in the solution results in more complexed crystal peaks that are nearly amorphous. The peak near $2\theta=26$ represents the peak for lithium iodide ((111) face), the peak near $2\theta=27$ represents the peak for lithium sulfide ((111) face), and the peak near $2\theta=28$ represents the peak for lithium bromide ((111) face).

Also, more shifting of these peaks may be considered to be more solid solution of other salt anions in the crystals represented by the peaks. For example, shifting of the peak for lithium iodide toward the high-angle end indicates contraction of the lithium iodide crystal lattice, the contraction of the crystal lattice resulting due to replacement by bromide ions or sulfide ions, which have smaller forms than iodide ions.

Incidentally, the reason that the peak for lithium bromide is reduced and the peak for lithium iodide increases as the concentration of raw material components in the solution increases, is thought to be that the lithium bromide forms a solid solution with lithium iodide.

While the preferred embodiments of the present invention disclosure are described in detail, it will be understood by one skilled in the art that the devices or chemicals, the manufacturers and grades thereof, the positions and arrangements of the production line, etc., which are employed in the method of the present disclosure, can be changed without departing from the scope of claims.

EXPLANATION OF SYMBOLS

1 Container
2 Heating apparatus
3 Good solvent solution
4 Spray nozzle
5 Atomized good solvent solution
6 Heated poor solvent
7 Circulating gas

What is claimed is:

1. A method for producing particles comprising:
   spraying a good solvent solution comprising a good solvent and a plurality of raw material components dissolved in the good solvent into a poor solvent having a temperature of at least 165° C. higher than the boiling point of the good solvent, to
   evaporate off the good solvent and precipitate particles comprising the plurality of raw material components.

2. The method for producing particles according to claim 1, wherein the good solvent solution is in a slurry further comprising at least one type of raw material component in powdered form dispersed in the good solvent.

3. The method for producing particles according to claim 1, wherein a total concentration of the plurality of raw material components dissolved in the good solvent is 10 g/l or greater.

4. The method for producing particles according to claim 1, wherein the plurality of raw material components are lithium sulfide, lithium iodide and lithium bromide, and the particles are raw material particles of a solid electrolyte material.

5. Solid solution particles comprising:
   sulfur, lithium, iodine and bromine as solid solution components,
   wherein positions of peaks from x-ray diffraction using CuKα rays attributable to the (111) faces of lithium sulfide, lithium iodide and lithium bromide are in a range of diffraction angle $2\theta=25.9°$ or greater and less than $28.0°$, and
   wherein a mean primary particle size of the particles is no greater than 5 μm.

* * * * *